United States Patent [19]

Quaranta

[11] Patent Number: 4,536,019
[45] Date of Patent: Aug. 20, 1985

[54] FLUID CONDUIT SYSTEM

[75] Inventor: Cosimo Quaranta, Turin, Italy

[73] Assignee: Tubiflex, S.p.a., Turin, Italy

[21] Appl. No.: 457,405

[22] Filed: Jan. 12, 1983

[30] Foreign Application Priority Data

Jan. 13, 1982 [IT] Italy .............................. 52817/82[U]

[51] Int. Cl.³ .............................................. F16L 21/06
[52] U.S. Cl. ..................................... 285/322; 285/374;
285/404; 285/420; 285/DIG. 4
[58] Field of Search ................. 285/253, DIG. 4, 322,
285/226 (U.S. only), 404, 382, 420

[56] References Cited

U.S. PATENT DOCUMENTS

| | | | |
|---|---|---|---|
| 510,481 | 12/1893 | Linzeler et al. | 285/253 |
| 591,468 | 10/1897 | Gold | 285/253 X |
| 817,060 | 4/1906 | Greenfield | 285/253 |
| 1,005,506 | 10/1911 | Brown | 285/322 |
| 1,340,818 | 5/1920 | Brinkman | 285/404 X |
| 2,474,556 | 6/1949 | Stone | 285/355 |
| 2,702,716 | 2/1955 | Basolo et al. | 285/322 |
| 3,365,218 | 1/1968 | Denyes | 285/253 |
| 3,407,449 | 10/1968 | Tetzlaff et al. | 285/253 X |
| 3,408,091 | 10/1968 | Zylstra | 285/253 X |
| 3,944,265 | 3/1976 | Hiemstra et al. | 285/419 |
| 4,142,743 | 3/1979 | McGowen et al. | 285/177 |
| 4,165,109 | 8/1979 | Foti | 285/177 |
| 4,176,865 | 12/1979 | Felton et al. | 285/DIG. 4 X |

FOREIGN PATENT DOCUMENTS

| | | | |
|---|---|---|---|
| 394571 | 12/1908 | France | 285/253 |
| 1253390 | 1/1961 | France | 285/382 |
| 175358 | 2/1922 | United Kingdom | 285/404 |

*Primary Examiner*—Thomas F. Callaghan
*Attorney, Agent, or Firm*—Watts, Hoffmann, Fisher & Heinke

[57] ABSTRACT

A fluid conduit system is disclosed which comprises a rigid duct pipe having a cylindrical outer surface, a flexible metal hose telescoped onto the pipe, a clamp assembly securing the hose to the pipe and a seal between the hose throat and the pipe. The flexible metal hose is constructed from interlocking helical convolutions defining a helicoidal interior throat formed in part by a helical recess, has an end region contacting the duct pipe surface and a plurality of generally axially extending slots formed in the hose end region. The clamp assembly is disposed about the hose end region for urging the hose into engagement with the pipe. The seal is disposed in the throat recess for blocking passage of fluid between the hose and the pipe through the recess.

9 Claims, 5 Drawing Figures

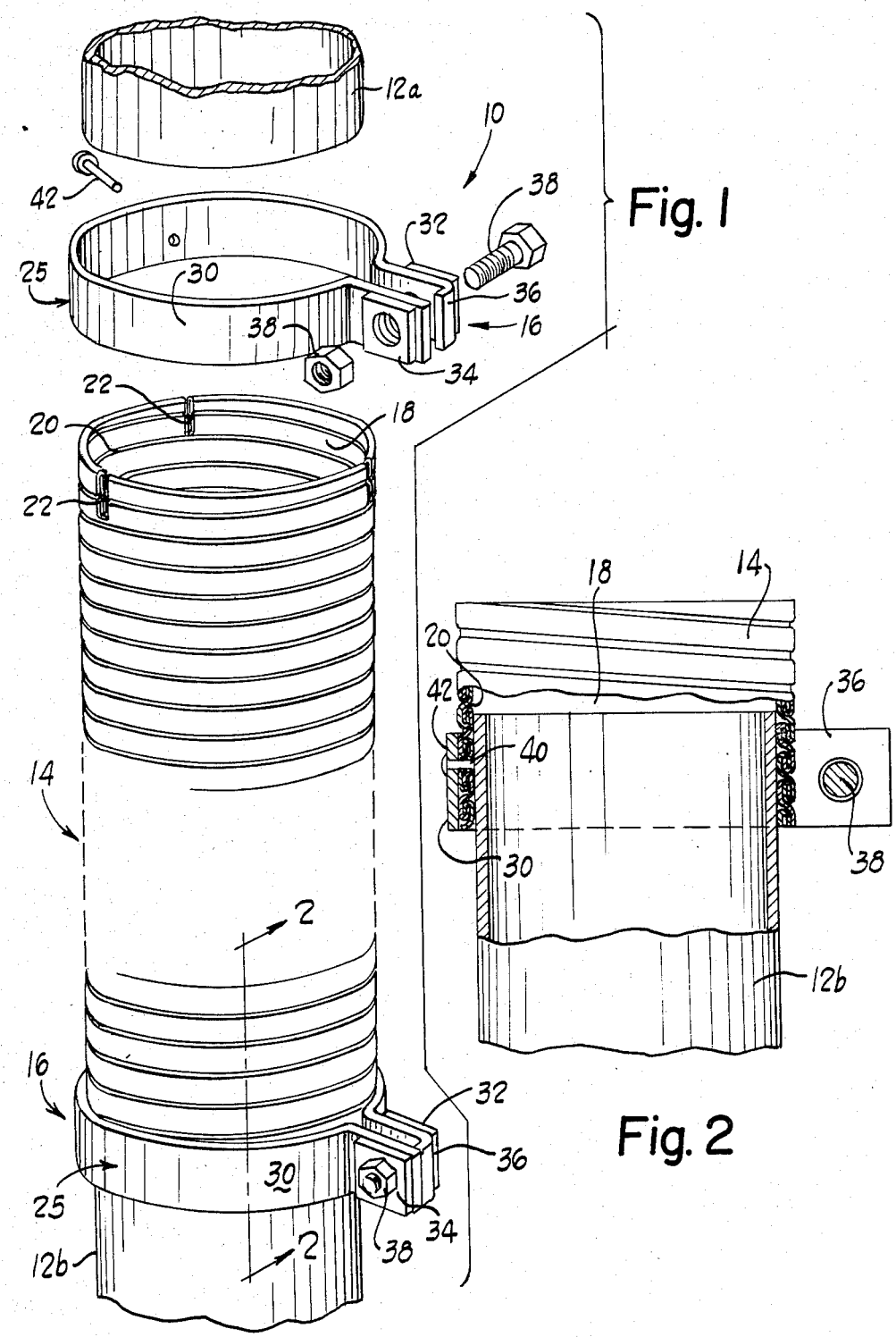

FLUID CONDUIT SYSTEM

DESCRIPTION

TECHNICAL FIELD

The present invention relates to fluid handling systems employing flexible hoses for handling high temperature gaseous fluids and more particularly relates to such systems where a flexible metal hose constructed from helical convolutions joins two spaced duct sections.

BACKGROUND ART

Flexible metal hoses have a variety of uses but one of the primary applications is in automotivre vehicles, particularly trucks, where the flexible metal hoses are assembled between an engine exhaut duct or pipe connected to the vehicle engine and an exhaust duct pipe attached to the chassis or vehicle of the body.

In the past flexible metal hoses have been welded in place between spaced ducts or pipes in engine exhaust systems. However, the welded constructions were not always satisfactory because the welding operation was frequently difficult and inconvenient to perform during the vehicle assembly, and when the union between the duct and flexible hose failed, removal and replacement of the flexible hose was a difficult and time-consuming task.

Accordingly, the prior art proposed various clamping arrangements by which respective ends of the flexible metal hose were secured to exhaust system pipes. In some proposals the hose and pipes were telescoped together and clamped by a U-shaped bolt and a cooperating block. These connections were not fluid-tight because the hose and pipe were slightly flattened and exhaust gas leaked between them to the atmosphere.

In other proposals the hose ends were aligned axially with exhaust duct system pipes and secured by a clamping arrangement which surrounded the union and clamped both the hose end and the duct pipe end in juxtaposition. These clamping assemblies were normally constructed from a tubular body which could be drawn tightly about both the duct pipe and the metal hose end to firmly secure the clamp to each of them. The clamp was normally provided with a seal to prevent the escape of exhaust gas between the adjacent ends of the pipe and hose and through the clamp. Since the duct pipe and hose were frequently of different diameters the clamp also had to be constructed so that adequate clamping and sealing forces could be applied.

While the prior art clamping assemblies tended to reduced the problems associated with repair and replacement of exhaust system components, the assembly of the flexible metal hose to the respective duct pipes was difficult and the clamps themselves were of multipart relatively costly construction. Still further, these clamps were sometimes subject to loosening over time because of vibrations encountered during operation of the vehicle.

DISCLOSURE OF THE INVENTION

The present invention provides a new and improved coupling for duct pipe and flexible metal hose which is of simple construction, inexpensive, easily installed and removed, and provides a simplified yet effective seal with the pipe.

In accordance with a preferred embodiment of the invention a flexible metal hose composed of helical convolutions defining a helicoidal interior throat, formed in part by a helical recess, is telescoped over the end of a duct pipe. A clamp assembly disposed about the hose end radially deforms the hose to securely engage the hose throat with the pipe end. A deformable sealing element is situated in the helical recess and is urged into sealing engagement with the pipe end surface to block fluid leakage between the pipe and the hose via the recess.

In a preferred embodiment of the invention the hose end receiving the pipe within it is provided with longitudinal slots to facilitate its radially inward deformation. The clamp assembly is fixed to the hose end so that the hose and clamp assembly form a single unit. The clamp assembly is fixed to the hose by a connector extending from the clamp assembly through the hose wall into the helical hose throat recess. The connector end structure in the recess forms a deformable seal which is urged into sealing engagement with the pipe and the hose to block leakage from the coupling when the clamp assembly deforms the hose.

Other features and advantages of the invention will become apparent from the following description of a preferred embodiment made with reference to the accompanying drawings.

BRIEF DESCRIPTION OF THE DRAWINGS

FIG. 1 is a partially exploded, perspective view of a fluid handling system constructed according to the invention;

FIG. 2 is a cross sectional view, seen approximately from the plane of a line 2—2 of FIG. 1.

BEST MODE FOR CARRYING OUT THE INVENTION

Figure 3:
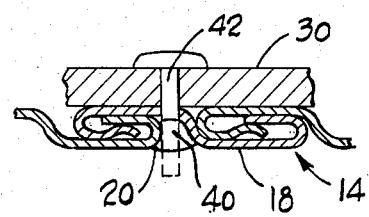
FIG. 3 is a fragmentary cross sectional view of part of a hose and clamp assembly constructed according to the invention.

A portion of a motor vehicle exhaust system 10 is illustrated by FIG. 1 of the drawings and includes exhaust duct pipes 12a, 12b, communicated by a flexible metal hose 14 extending between them, with the pipes 12a, 12b and the hose 14 secured together by couplings 16 constructed in accordance with the present invention.

For the purpose of illustration and description, the pipe 12a forms a part of an exhaust duct system connected to the vehicle engine while the pipe 12b forms a part of a duct system attached to the vehicle chassis or body. The pipes are preferably constructed from steel and define cylidrical outer surfaces at their ends. The flexible hose extending between the pipes allows the exhaust system to be assembled in a substantially fluid-tight relationship while accommodating slight misalignments between the pipes and cushioning vibrations which would otherwise be transmitted from one pipe to the other during operation of the vehicle.

The flexible metal hose 14 is constructed in a conventional manner from interlocking convolutions of stainless steel material and as such defines a helicoidal interior throat 18 having a helical recess 20 extending the length of the hose. The opposite end regions of the hose 14 are each provided with a plurality of slots 22 opening at the hose end and extending axially a short distance from the hose end to facilitate radial deformation of the hose end into clamping engagement with the pipe. The inner diameter of the hose 14 and the outer diameter of the pipes 12a, 12b are substantially the same with the hose diameter being just large enough to enable the ends of the hose to be slipped over the respective duct pipe ends.

The coupling 16 includes a clamp assembly 25 disposed about each end region of the hose 14 for securing the hose to the pipes and providing a seal to block flow of exhaust gas from the exhaust system to atmosphere via the coupling. In the preferred and illustrated embodiment the clamp assembly comprises a collar 30 substantially encircling the hose end region and a clamp mechanism 32 for tightening the collar about the hose and thus urging the hose into tight frictional engagement with the associated pipe. The collar 30 is a split generally ring-like member having an axial length which exceeds the depth of the slots 22 and formed of structurally strong resilient material such as steel.

The clamping mechanism is formed by ears 34, 36 exending radially from the spaced ends of the collar member and a nut and screw 38 assembled to the ears and which, when tightened, move the collar member ends toward each other to clamp the collar member, hose and pipe together as the collar member is urged into engagement with the hose circumferentially about its perimeter.

Leakage of exhaust gas between the ends of the hose and pipe via the coupling 16 is blocked by a seal element 40 disposed in the helical recess 20 and which is engaged between the pipe and the hose when the clamp assembly is tightened. The seal element 40 is located axially slightly beyond the closed ends of the slots 22 and in axial alignment with the collar member 30. When the collar member is tightened the seal element 40 is forcibly engaged with the pipe and deformed into sealing engagement between the pipe and the helical hose recess.

In the preferred embodiment of the invention the sealing element is formed as part of a connector 42 which fixes the clamp assembly to the hose 14 as a unitary assembly (see FIG. 3). The connector 42 thus maintains the collar member accurately aligned with the hose end region during assembly of the hose to the pipes 12. This reduces the number of parts required to be maintained on hand by the vehicle manufacturer and simplifies the assembly.

In the embodiment of the invention illustrated by FIG. 3 the connector 42 is formed by a rivet having a head engaged on the exterior of the collar member and a shank extending through a hole in the collar member. The shank extends from the collar member through a hole in the wall of the hose 14 and to the seal element 40 which is provided by an enlarged deformable end structure on the rivet shank. When the rivet is set the projecting deformable rivet shank end structure is upset and flows into conforming engagement with the helical recess and the hole in the hose wall. FIG. 3 illustrates the rivet shank end structure before setting (on broken lines) and after the rivet is set to form the seal element 40. The rivet is set by any suitable or conventional setting tools which are not illustrated.

Figure 4:
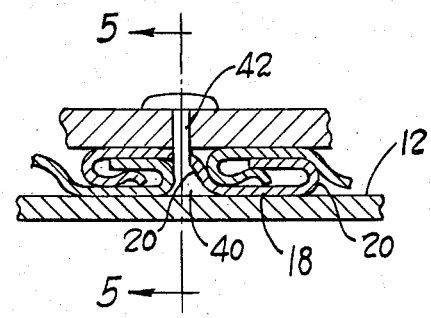
FIG. 4 is a fragmentary cross sectional view of part of the hose and clamp assembly of FIG. 3 assembled to a duct; and, FIG. 5 is a cross sectional view seen approximately from the plane indicated by the line 5—5 of FIG. 4.
Figure 5:
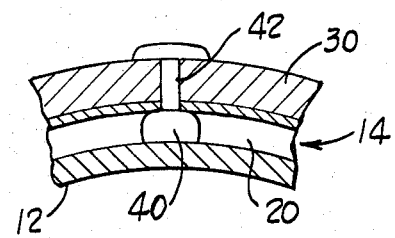

The rivet is constructed from a material which is sufficiently soft to permit the deformation referred to during setting of the rivet, yet structurally strong enough to maintain the clamp and hose assembled during storage, shipment and while the hose is assembled to the exhaust pipes 12. When the hose is telescoped over a pipe end and the clamp assembly is tightened, the deformable end of the rivet makes sealing engagement with the pipe surface and is pressed into sealing engagement with the helical recess in the hose as well as blocking the hole in the hose side wall. The clamping force provided by the coupling 16 engages the hose throat with the circumferential surface of the pipe to complete the seal. FIGS. 4 and 5 illustrate the hose and pipe assembled together with the clamp assembly tightened.

While only a single embodiment of the present invention has been illustrated and described herein in considerable detail, the present invention is not to be considered limited to the precise construction shown. Various adaptations, modifications and uses of the invention may occur to those skilled in the art to which the invention relates and the intention is to cover hereby all such adaptations, modifications and uses falling within the spirit or scope of the appended claims.

I claim:

1. A fluid conduit system comprising:
   (a) a rigid duct portion having a cylindrical outer surface;
   (b) a flexible metal hose constructed from interlocking helical convolutions defining a helicoidal interior throat formed in part by a helical recess, said hose comprising:
      (i) an end region telescoped over said duct portion with said interior throat confronting and contacting said duct portion surface so that said helical recess confronts said duct portion;
      (ii) a plurality of generally axially extending slots formed in said hose end region and axially aligned with said duct portion;
   (c) clamp means disposed about said hose end region and said duct portion, said clamp means comprising a member for urging said hose into engagement with said duct portion; and,
   (d) seal means disposed in said recess, said seal means comprising a rivet extending through the hose wall and having a deformed end structure disposed in and conforming to the helical recess, said end structure urged into sealing engagement with said duct portion by said clamp means for blocking passage of fluid between said hose and duct portion through said helical recess.

2. The conduit system claimed in claim 1 wherein said clamp means is fixed to said hose by said rivet.

3. A fluid conduit system comprising:
   (a) a rigid duct portion having a cylindrical outer surface;
   (b) a flexible metal hose constructed from interlocking helical convolutions defining a helicoidal interior throat formed in part by a helical recess, said hose comprising:
      (i) an end region telescoped over said duct portion with said interior throat confronting and contacting said duct portion surface so that said helical recess confronts said duct portion;
      (ii) a plurality of generally axially extending slots formed in said hose end region and axially aligned with said duct portion;
   (c) clamp means disposed about said hose end region and said duct portion, said clamp means comprising a member for urging said hose into engagement with said duct portion; and, (d) seal means disposed in said recess in axial alignment with said clamp member and said duct portion, said seal means urged into sealing engagement with said duct portion by said clamp means for blocking passage of fluid between said hose and duct portion through said helical recess;

(e) said clamp means attached to said hose by a connector including an element extending through the hose wall from the clamping member, said seal means fixed to said connector element.

4. The conduit system claimed in claim 3 wherein said clamp means is secured to said hose by a rivet, and wherein said seal means is formed by an end of said rivet.

5. A flexible hose assembly adapted to be clamped at an end about a duct pipe comprising:

(a) a flexible metal hose constructed from interlocking helical convolutions defining an interior throat forming a helical recess extending the length of the hose, an end region of the hose having a plurality of generally longitudinal slots extending a predetermined distance from the hose end;

(b) clamp means disposed at said hose end region, said clamp means comprising a collar member extending substantially about the hose end region in radial alignment with said slots and a clamping mechanism for drawing said collar into compressive relationship with said hose to deform said hose end region radially inwardly for clamping to the duct; and, (c) connector means for fixing said collar member to said hose end region comprising a connector member extending from said collar member through the hose wall into said helical recess, said connector member including end structure in said recess for blocking fluid flow through the recess between said hose end region and the duct to which the hose is clamped.

6. The flexible metal hose as claimed in claim 5 wherein said clamp means and connector means are disposed at opposite ends of the hose.

7. The hose claimed in claim 5 wherein said connector means comprises a rivet having a shank extending through the wall of said hose from said collar member to said end structure.

8. The hose assembly claimed in claim 7 wherein said clamping mechanism comprises radially extending ears formed on said collar member and a threaded fastener associated with said ears to tighten said collar member about said hose.

9. The hose claimed in claim 8 wherein said collar member extends axially along said hose from its end beyond said slots, said connector end structure disposed in said recess axially beyond said slots.

* * * * *